United States Patent

Kurokawa

[15] 3,635,689
[45] Jan. 18, 1972

[54] COOLING DEVICE IN A GLASS BULB BLOWING APPARATUS

[72] Inventor: Takaaki Kurokawa, Chigasaki-shi, Japan

[73] Assignee: Tokyo Shibaura Denki Kabushiki Kaisha a/k/a/ Tokyo Shibaura Electric Co. Ltd., Kanagawa-Ken, Japan

[22] Filed: July 28, 1969

[21] Appl. No.: 845,391

[30] Foreign Application Priority Data

July 31, 1968 Japan....................43/54082

[52] U.S. Cl....................65/185, 65/243, 65/265, 65/350, 65/351
[51] Int. Cl. .....................C03b 9/28
[58] Field of Search...............65/184, 185, 186, 243, 264, 65/265, 349, 350, 351

[56] References Cited

UNITED STATES PATENTS 1,790,397   1/1931   Woods et al. ..................65/184 X Primary Examiner—Arthur D. Kellogg
Attorney—Robert E. Burns and Emmanuel J. Lobato

[57] ABSTRACT

A cooling device in a glass bulb blowing apparatus usually called "Ribbon Machine" for manufacturing electric lamp bulbs or glass bulbs, in which apparatus molten glass discharged from an orifice of a glass-melting furnace is pressed into ribbon shape by means of a pair of feed rollers and is positively fed thereby to a plate link device, a blow-head link device and a mold-operating link device operating synchronously with said feed rollers said devices blowing said ribbon-shaped glass into electric lamp bulbs or glass bulbs, said cooling device comprising a blow-head link device surrounding a pair of sprockets, cams provided on a guiding rail for shifting upward and downward the blow head of said blow-head link device, and forming air and cooling air reservoirs for supplying air forming and cooling respectively into said blow head successively and compulsorily, whereby said glass bulb blowing apparatus is simplified without employing independently provided cooling devices.

6 Claims, 6 Drawing Figures

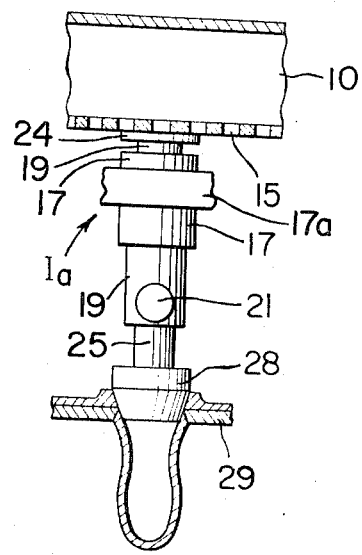
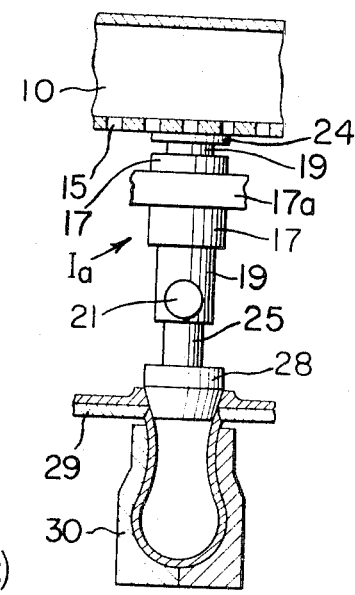
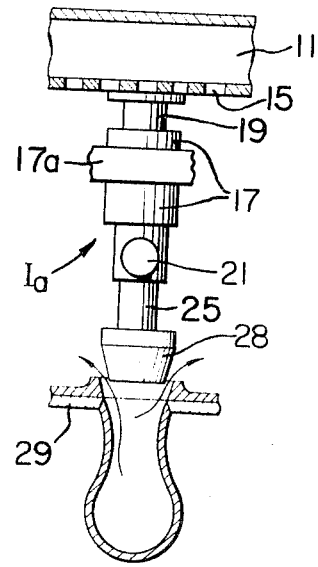

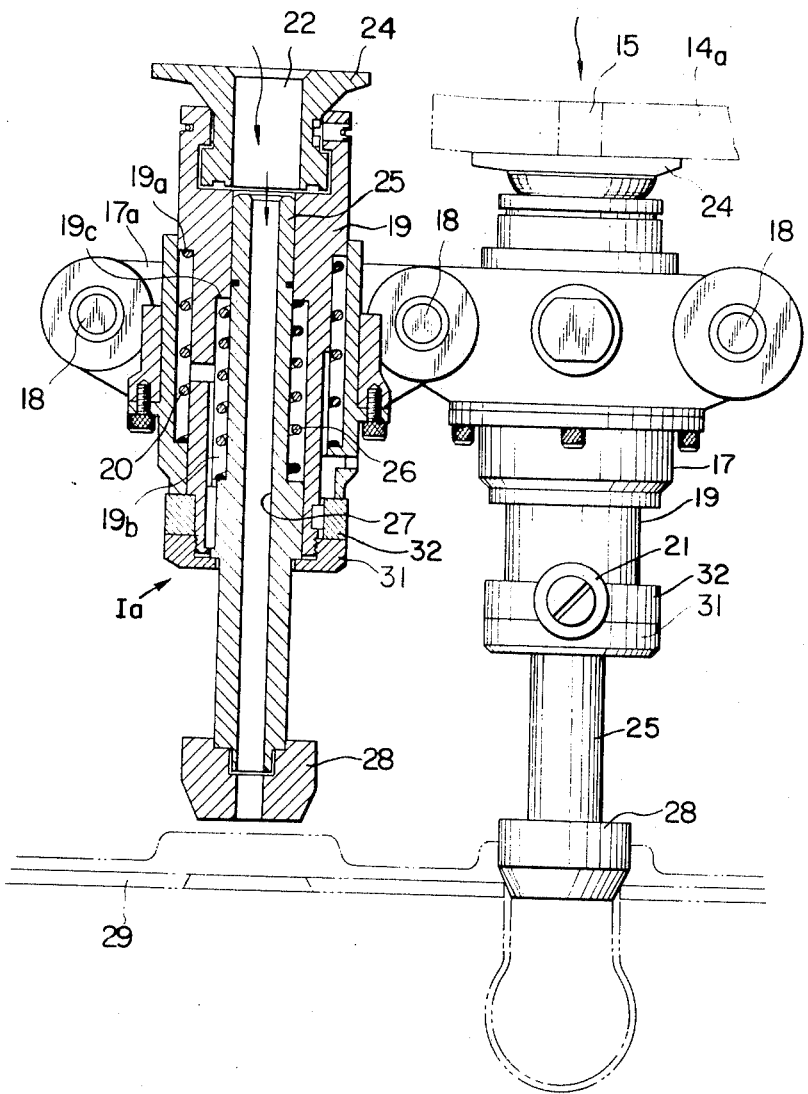

COOLING DEVICE IN A GLASS BULB BLOWING APPARATUS

BACKGROUND OF THE INVENTION

This invention relates to a glass bulb blowing apparatus and, more particularly, to a cooling device in the glass bulb blowing apparatus.

Heretofore known molded bulb cooling device provided in a glass bulb blowing apparatus have been of a natural coding type. However, since the cooling device is essential to the quality of products, for example electric lamp bulbs, there has been proposed a molded bulb cooling device incorporated in a glass bulb blowing apparatus independently from and on the rear side of blow-head conveyor for blowing glass bulbs.

In such a construction, because of the large space occupied by the cooling device, the entire glass bulb blowing apparatus is subject to limitation with respect to the space for installation thereof, and, moreover, is costly because of the cooling device independently incorporated therein independent.

SUMMARY OF THE INVENTION

Therefore, it is an essential object of the invention to provide an improved molded bulb cooling device which can eliminate such disadvantages of the conventional apparatus as described above and to provide a less bulky and less costly glass bulb blowing apparatus.

The above object and other objects of the invention have been effectively attained by utilizing blow heads for both purposes of blow-molding and cooling, the blow heads cooperating with molding air and cooling air reservoirs for supplying air for molding and cooling respectively into the blow heads successively and compulsorily.

The nature, principles, details and utility of the invention will be more clearly apparent from the following detailed description with respect to a preferred embodiment of the invention when read in conjunction with the accompanying drawings, in which like parts are designated by like reference numerals.

BRIEF DESCRIPTION OF THE INVENTION

FIG. 2 shows steps of blowing and cooling operations of a blow head incorporated in a blow-head conveyor provided in the above-described glass bulb blowing apparatus according to the invention;

FIG. 4 shows a longitudinal section of two contiguous blow heads used in the device according to the invention.

DETAILED DESCRIPTION OF THE INVENTION

Figure 1:
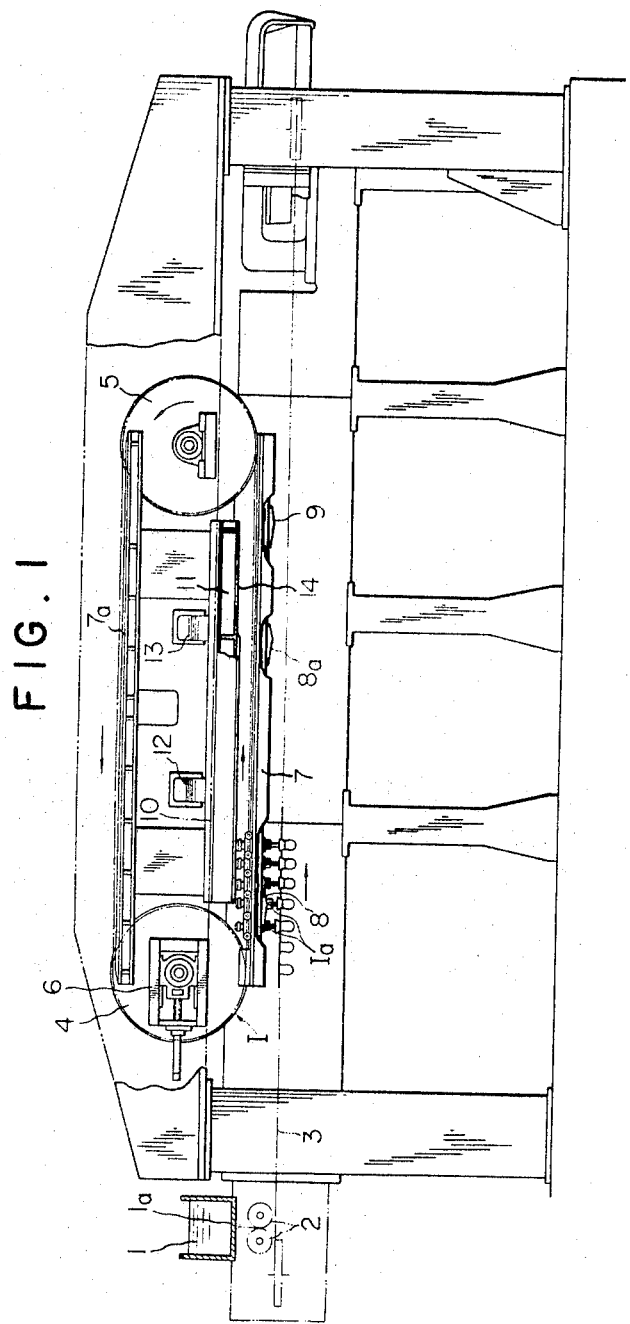
FIG. 1 is an elevational view showing schematically a glass bulb blowing apparatus provided with the cooling device according to the invention.

In FIG. 1, the glass bulb blowing apparatus according to the invention comprises a melting furnace 1 for melting glass materials, in the bottom of which is provided an orifice 1a for discharging molten glass therethrough. A pair of spaced-apart feed rollers 2 are rotatably provided below the melting furnace 1.

Therefore, molten glass discharged from the orifice 1a is pressed into a ribbon by the feed rollers 2. This ribbon of glass is fed on a plate conveyor 3 provided horizontally in the apparatus, thereby to be positively transported toward a blow-head conveyor I and mold-opening-and-closing (not shown) operating synchronously.

As shown in FIG. 1, the above-described blow-head conveyor I means around sprocket wheels 4 and 5 and the shaft of the sprocket wheel 4 is journaled by a takeup unit 6 for controlling the tension of the blow-head conveyor I.

Figure 3:
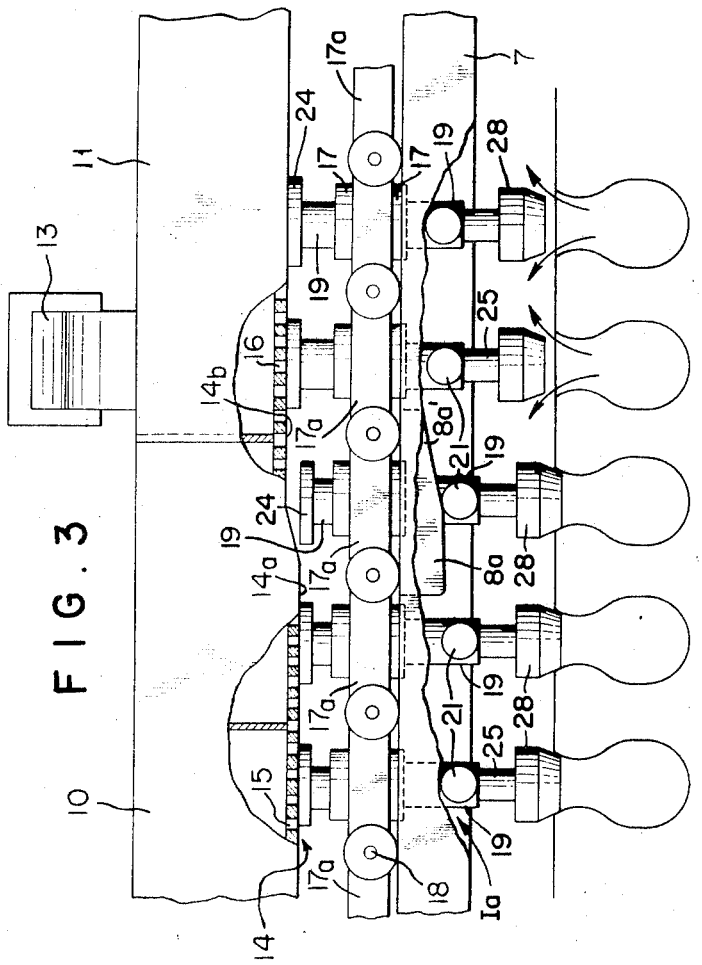
FIG. 3 is a fragmentary elevation partly broken away, of the essential portion of the cooling device according to the invention.

The above-described blow-head conveyor I moving around the sprockets 4 and 5 constitutes a chain composed of plurality of a blow heads 1a as shown in FIG. 4. These blow heads 1a are guided by upper and lower rails 7a and 7 integrally formed on the frame of the apparatus to move along a loop-shaped track. Cams 8, 8a and 9 are provided on the lower surface of the guiding rail 7. A molding air reservoir 10 and a cooling air reservoir 11 are provided in adjacent relation to each other and extend in parallel relation to and above the rail 7. A supply port 12 for supplying compressed air from outside of the apparatus is provided on the upper side of the molding air reservoir 10, and a supply port 13 is provided on the upper side of the cooling air reservoir 11 for supplying thereto compressed air for cooling. As shown in FIG. 3, bottom plates 14 of the reservoirs 10 and 11 are provided respectively with a series of holes 15, 16 for supplying molding and cooling air into the blow heads 1a. Further, the holes 15 have a diameter smaller than that of the holes 16. The latter holes 16 have a relatively large diameter in order to eject a large quantity of cooling air. The bottom plate 14b of said cooling air reservoir 11 is located at a higher level than the bottom plates 14a of the molding air reservoir 10 and the blow heads 1a are elevated correspondingly under the reservoir 11 as described hereinbelow.

The construction of the blow heads 1a will be described in detail with reference to FIGS. 3 and 4. Each body 17 of the blow heads 1a has a pair of lugs 17a provided on the upper portion thereof, and mating lugs of adjacent blow heads are connected by a pin 18 thereby to form a chain of interconnected blow heads extending around the sprockets 4 and 5. The body 17 of the blow head is provided therethrough with a vertically stepped bore as shown in FIG. 4, and a sleeve 19 is slidably fitted in this stepped bore. A compression spring 20 is mounted between a shoulder 19a of the sleeve 19 and a step of the body 17, urging the sleeve 19 in an upward direction. However, the upward movement of this sleeve 19 is arrested a ring 32 rigidly secured on the lower portion of the sleeve 19 by a nut 31 (FIG. 4). The ring 32 carries thereon a pair of cam follower rollers 21. The sleeve 19 is provided at its upper end with a blow shoe 24 having a hole 22 for introducing air from respective air reservoirs 10, 11 when coming into contact with the bottom plates 14a, 14b of the reservoirs 10, 11. Further, an air pipe 25 is fitted within the central bore 19b of the sleeve 19 and a compression spring 26 mounted between a lower step of the air pipe 25 and an inner step 19c of the sleeve 19. A bore 27 of a small diameter is provided through the center of the air pipe 25 in the longitudinal direction thereof and the lowermost end of the bore 27 is open to the outside of the apparatus. A blow tip 28 rigidly secured on the lower end of the air pipe 25 has a shape and dimension so as to releasably engage with the hole provided in plate 29 of the plate conveyor device 3 as shown in FIG. 2.

In the construction as described above, when the blow shoe 24 comes into contact with the bottom plate 14a of the molding air reservoir 10, compressed air therein passes through the holes 15 of the bottom plate 14a into the bore 22 of the shoe 24 as shown in FIG. 2 (A), while the air pipe is urged in the downward direction by the force of the compression spring 26. Consequently, the blow tip 28 of the air pipe 25 engages with the hole provided in the plate 29 by the intermediary of semimolten ribbon-shaped glass fed on the plate 29 of the plate conveyor 3. Then, compressed air entering through the hole 22 of the blow shoe 24 passes through the small-diameter bore 27 of the air pipe 25 to be blown against the surface of the ribbon-shaped molten glass. Thus, molten glass is blown by compressed air into the shape corresponding to that of the mold 30 FIG. 2(B).

The operation of the apparatus according to the invention will now be described.

Uniformly molten glass discharged through the orifice 1a of the glass-melting furnace 1 is fed by feeding rollers 2 the plate conveyor 3, in the form of ribbon-shaped molten glass and is transported toward the blow-head conveyor 1 and mold-opening-and-closing conveyor (not shown).

At this moment, one of the blow heads 1a carried by blowhead conveyor 1 moving around the sprockets 4 and 5 approaches gradually under the guide of rail 7 in a horizontal direction as shown by the arrow in FIG. 1. Then, the follower rollers 21 of the blow head 1a come into contact with the surface of the cam 8 of the rail 7 thereby urging downward the sleeve 19 of the blow head against the force of spring 20 as shown in FIG. 4. Therefore, the upper surface of the shoe 24 on sleeve 19 moves below the bottom plate 14a of compressed air reservoir 10 without colliding with the lower edge of the reservoir 10 and the blow tip 28 is forced into contact with the glass ribbon on the plate 29 in such a manner that the air pipe 25 is shifted slightly upwards relative to the sleeve 69 thereby compressing the spring 26. When roller 21 of the blow head 1a has passed beyond the cam surface of the cam 8, the shoe 24 is pressed upward by the force of the compressed spring 20 to engage the bottom plate 14a of the blowing air reservoir 10. Upon the upward movement of the shoe 24 and hence the sleeve 19, the compressed spring 26 urges the air pipe 25 downward relative to the sleeve 19 thereby maintaining the blow tip 28 firmly engaged with the glass ribbon. Therefore, compressed air in the reservoir 10 passes through the holes 15 of bottom plates 14a thereof (as shown in FIG. 2 (A)) and supplied into holes 22 of the shoe 24 of the blow head 1a as shown in FIG. 4. As described above, the compression spring 26 urges the air pipe 25 downward, the blow tip 28 of the air pipe being kept in engagement with a hole provided in the plate 29 through the intermediary of semimolten glass layer on the plate 29. On the other hand, compressed air supplied through the hole 22 passes through the bore 27 of the air pipe 25 to begin to blow-mold the molten glass (FIG. 2 (A)). Since the blow head 1a moves rightward synchronously with the rotation of the sprockets 4 and 5, compressed air continues to be supplied onto the surface of semimolten glass. The mold 30 of the mold-opening-and-closing conveyor operated synchronously with the supply of compressed air limits the shape and dimensions of the molten glass being blown. When molten glass has been blown into the shape of an electric lamp bulb, for example by the blowing effect of compressed air, the rollers 21 carried by the blow head 1a come into contact with the surface of the second cam 8a of said rail 7, and the corresponding blow head moves below the bottom plate 14b of the following cooling air reservoir 11. At this moment, the whole structure of the blow head 1a leaves the cam 8a thereby to be elevated as shown in FIG. 2 (C) and FIG. 3. Therefore, the blow tip 28 of the air pipe 25 is disengaged from the molded glass bulb, and further extension of the air pipe 25 by the compression spring 25 is prevented due to abutment of the shoulder on the air pipe 25 against the nut 31, and, at the same time, a sufficient quantity of cooling air from the cooling air reservoir 11 is supplied into the blown glass bulb to rapidly cool and solidify the bulb. Then, when the roller 21 of the blow head 1a comes into collision with the cam surface of the third cam 9 provided at the other end of the rail 7 to guide the roller 21 to its original position, the upper surface of the shoe 24 formed integrally with sleeve 19 is disengaged from the bottom plate 14b of cooling air reservoir 11. When the rollers 21 has passed beyond the cam surface of cam 9, blow head 1a moves along the circumference of sprocket 5, and is guided by upper rail 7a to return to its original position, where said blow head 1a resumes the next cycle of operations involving blowing of molten glass and cooling thereof.

Cooling air in the cooling air reservoir 11 can be replaced by other suitable gases such as, for example, antimony oxide for coloring the glass bulb and sulfur dioxide gas for strengthening the surface of the glass.

As described above, in the apparatus for blowing glass bulb according to the invention, the molded bulb cooling device provided as an independent device in the heretofore known techniques can be eliminated, and the whole apparatus for blowing glass bulb can be less bulky. Furthermore, since the blow heads can be transfered immediately from the blowing process to the cooling process, hardening of the surface of blown molten glass bulbs can be advantageously carried out in a very effective manner.

I claim:

1. In a glass-blowing apparatus: means for longitudinally advancing a layer of molten glass to be blown into glass articles through a treating zone; a series of spaced-apart glass molds disposed beneath the path of travel of and movable in synchronization with the advancement of the layer of molten glass through said treating zone; a plurality of spaced-apart glass-blowing heads disposed above the path of travel of and movable in synchronization with the advancement of the layer of molten glass and each disposed above and in alignment with one of said glass molds, each said glass-blowing head having means therein defining a fluid passage; a first housing disposed along said path of travel containing therein during use of the apparatus a source of blowing fluid; a second housing disposed along said path of travel downstream from said first housing containing therein during use of the apparatus a source of cooling fluid; and guide means for successively guiding each said glass-blowing head during movement thereof through said treating zone to a first position wherein one end of the fluid passage provided in said glass-blowing head communicates with said first housing and the other end of said fluid passage presses the molten glass into its associated glass mold whereby blowing fluid travels through said glass-blowing head and blows the molten glass into a glass article having the configuration of the glass mold and wherein said guide means includes means for successively guiding each said glass-blowing head to a second position wherein said one end of the fluid passage communicates with said second housing and said other end of said fluid passage is spaced apart from and in communication with the blown glass article whereby cooling fluid travels through said glass-blowing head and effectively cools the blown glass article.

2. A glass-blowing apparatus according to claim 1 wherein each said glass-blowing head comprises a body portion, a movable portion retractable into and extendable out of said body portion, and means urging said movable portion into its extended position; and wherein said guide means includes means for retracting said movable portion into said body portion when said glass-blowing head is in said second position to effectively space same apart from the blown glass article.

3. A glass-blowing apparatus according to claim 2; wherein said means for retracting said movable portion into said body portion comprises a profiled cam disposed along said path of travel, and a cam follower connected to each said glass-blowing head cooperative with said profiled cam to effect retraction of said movable portion.

4. A glass bulb blowing apparatus comprising: a blow head conveyor advanceable longitudinally of the apparatus, a series of blow heads suspended from said conveyor, means for advancing a molten glass ribbon longitudinally of the apparatus below and along the path of travel of said blow heads in synchronism with the latter, a blowing air reservoir located above and along said path of travel of said blow heads to supply pressurized blowing air into and through said blow heads to effect a glass bulb molding operation, a cooling air reservoir located downstream from said blowing air reservoir and extending above and along said path of travel of said blow heads cooperative with the blow heads which have advanced beyond the region of said blowing air reservoir to supply cooling air into and through the blow heads to effect a forced bulb cooling operation, and means for successively shifting the blow heads which have passed beyond the region of said blowing air reservoir to an upward position in the region of said cooling air reservoir to bring the blow heads into cooperative relation with said cooling air reservoir and to move the lower ends of the blow heads out of engagement with the glass ribbon to form air escape gaps therebetween whereby air from the cooling air reservoir ejected during the forced cooling operation and flowing through the blow heads into the glass bulbs can escape to the outside through said gaps.

5. The glass bulb blowing apparatus according to claim 4, wherein said cooling air reservoir has a blow head-engaging perforated bottom portion disposed at a higher level than that of said blowing air reservoir to ensure that when said blow heads advance under the cooling air reservoir they are maintained spaced upward from the glass ribbon thereby allowing the cooling air ejected into the internal spaces of the molded bulbs to escape therefrom.

6. The glass bulb blowing apparatus according to claim 4, further including cam means acting on the advancing blow heads at a region between said blowing and cooling air reservoirs to shift the blow heads downward and then allow same to be shifted upward for effecting smooth transfer of the blow heads from the region of said blowing air reservoir to the region of said cooling air reservoir.

* * * * *